United States Patent [19]

Shinoda

[11] Patent Number: 4,490,790
[45] Date of Patent: Dec. 25, 1984

[54] METHOD AND APPARATUS FOR SELECTING GEARS OF AN AUTOMATIC TRANSMISSION

[75] Inventor: Kazuo Shinoda, Toyota, Japan

[73] Assignee: Toyota Jidosha Kogyo Kabushiki Kaisha, Toyota, Japan

[21] Appl. No.: 323,553

[22] Filed: Nov. 20, 1981

[30] Foreign Application Priority Data

May 29, 1981 [JP] Japan .............................. 56-80913

[51] Int. Cl.³ ...................... B60K 41/08; G06F 15/20
[52] U.S. Cl. .................................... 364/424.1; 74/866
[58] Field of Search ........................ 364/424.1; 74/866

[56] References Cited
U.S. PATENT DOCUMENTS

| | | | |
|---|---|---|---|
| 4,282,780 | 8/1981 | Totani et al. | 74/866 |
| 4,285,252 | 8/1981 | Yamaki et al. | 74/866 |
| 4,318,312 | 3/1982 | Morimoto et al. | 74/866 |
| 4,338,666 | 7/1982 | Suzuki et al. | 364/424.1 |
| 4,354,236 | 10/1982 | Miki et al. | 364/424.1 |
| 4,412,290 | 10/1983 | Pannier | 364/424.1 |

Primary Examiner—Felix D. Gruber
Attorney, Agent, or Firm—Cushman, Darby & Cushman

[57] ABSTRACT

A gear selection state in an electronically controlled automatic transmission for a vehicle is determined in relation to the vehicle speed and speed of opening of a throttle valve in an intake system, i.e. depression of speed of an accelerator pedal. According to this invention, the faster the speed of the accelerator pedal depression, the greater the change in the gear change pattern is increased. Thus, a more desirable vehicle acceleration response is obtained.

12 Claims, 9 Drawing Figures

METHOD AND APPARATUS FOR SELECTING GEARS OF AN AUTOMATIC TRANSMISSION

BACKGROUND OF THE INVENTION

1. Field of the Invention

This invention relates to a method of and apparatus for changing the gears of an automatic transmission which controls the gear selection by use of an electronic device such as a microcomputer and the like.

2. Description of the Prior Art

The prior method for changing the gears of an automatic transmission determines primarily the gear selection mode according to the opening of a throttle valve in an intake system and the vehicle speed, without changing the gear selection pattern according to the speed of the accelerator pedal depressed by the driver. Hence, even if the driver depresses the accelerator pedal rapidly, expecting large acceleration, or slowly, expecting small acceleration, the same gear selection mode is obtained when the depression amount of the accelerator pedal, i.e. the opening of the throttle valve in the intake system, is the same. Hence, if the accelerator pedal is depressed rapidly, shift-up occurs too soon to provide sufficient desired acceleration, and if depressed slowly, the shift-up tends to be delayed thereby increasing travelling time in the low gear mode, and giving dissatisfactory performance to the driver while producing losses in fuel efficiency.

SUMMARY OF THE INVENTION

An object of this invention is to provide a method of and apparatus for changing gears in an automatic transmission which can satisfy the expectation of the driver depressing the accelerator pedal.

According to this invention, the higher the depression speed of the accelerator pedal, the faster the vehicle speed is changed.

Consequently, the value of a reference vehicle speed to be changed in relation to the depression speed of the accelerator pedal is altered so that acceleration satisfying the expectation of the driver can be obtained, and engine noise and fuel consumption can be minimized.

The depression speed of the accelerator pedal may be obtained through the increased speed of the opening of a throttle valve in an intake system. The opening of the throttle valve in the intake system is detected at intervals of a predetermined time to detect the increased speed of the opening of the throttle valve in the intake system from the difference between the present and the previous opening of the throttle valve.

It is preferable that a defined factor TG, varying with the increased speed of the opening of the throttle valve in the intake system, sets a reference gear selection line which is shifted dependent on the accelerator pedal depression.

A constant multiplied by the difference $\theta - \theta_0$ between the opening $\theta$ of the throttle valve in the intake system detected at a present time and the opening $\theta_0$ of the same detected at a previous time is defined as $\Delta TG$, and $TG + \Delta TG$ is defined as a new TG. Also, the value of TG minus a predetermined amount tG at intervals of a predetermined time $TG - tG$, is preferably defined as a new TG.

Further, preferably, the reference gear selection line is initialized to correspond to $TG = 1$, and if the vehicle speed to be changed when $TG = 1$ is $V_1$, the vehicle speed $V_2$ to be changed when $TG \neq 1$ is represented by the formula $V_2 = TG \times V_1$.

DETAILED DESCRIPTION OF PREFERRED EMBODIMENTS

Figure 1:
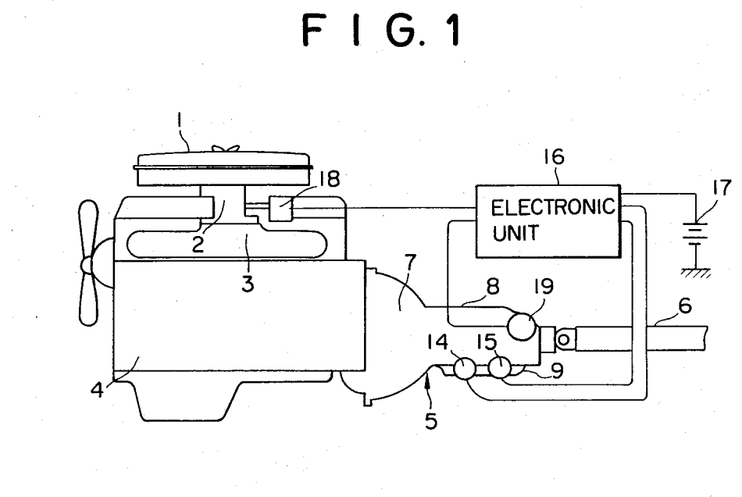
FIG. 1 is a schematic illustration showing an engine to which the present invention is applied.

In FIG. 1, 1 designates an air cleaner, 2 a carbureter, 3 an intake manifold and 4 an engine body. Power of the engine body 4 is transmitted to a driving wheel (not shown) through an automatic transmission 5 and propeller shaft 6. The automatic transmission 5 comprises a fluid type torque converter 7, gearing 8 and oil pan 9 beneath the gearing 8. A hydraulic control (not shown) is disposed in the oil pan 9 to control the supply of oil pressure to a hydraulic servo for a frictional engaging unit in the gearing 8 for accomplishing a predetermined range and gear selection mode. An electromagnetic shift valve for 1st–2nd gear and an electromagnetic shift valve for 2nd–3rd gear are respectively designated by 14, 15 as shift valves for the hydraulic control, and are opened and closed to change the supply of oil pressure to the hydraulic servo for changing, respectively, between the 1st and 2nd gears and the 2nd and 3rd gears. An electromagnetic unit 16 is connected to a battery 17 of DC power supply to receive the input detecting signals from a potentiometer 18, for detecting the opening of a throttle valve in the carbureter 2, and a DC tachometer 19 as a vehicle speed sensor, for detecting the rotational speed of an output shaft of the automatic transmission 5 for controlling the opening and closing of the electromagnetic valves 14, 15. While the DC tachometer 19 generates analog signals in proportion to the rotational speed of the output shaft, an electromagnetic pick-up for generating pulses in synchronization with the rotation of the output shaft may be employed instead of the DC tachometer 19. The following table shows the relationship between the operational conditions of the electromagnetic valves 14, 15 and gear selection mode;

| Gear selection mode | 1st gear | 2nd gear | 3rd gear |
| --- | --- | --- | --- |
| Electromagnetic valve 14 for 1st–2nd gear | off | on | on |
| Electromagnetic valve 15 for 2nd–3rd gear | off | off | on |

Figure 2:
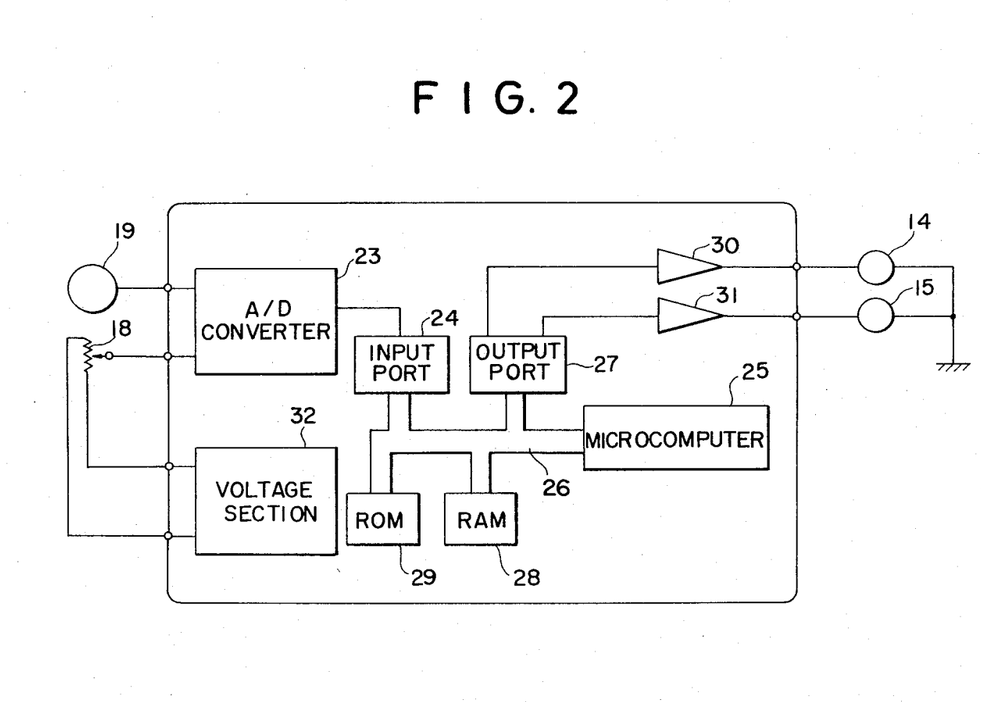
FIG. 2 is a block diagram showing an electronic device shown in FIG. 1.

FIG. 2 is a block diagram showing details of the electronic unit 16 shown in FIG. 1. The detecting signals of the potentiometer 18 and the DC tachometer 19 are sent to an A/D (analog/digital) converter 23 to be converted to digital values, and then sent to an input port 24. A microcomputer 25 is connected through a bus line 26 to the input port 24, an output port 27, RAM 28 and ROM 29 for a program memory section used to compute the gear selection mode, and send the output corresponding to the computed result through the output port 27 and amplifiers 30, 31 to the electromagnetic valves 14, 15. 32 designates a voltage section for determining the terminal voltage of the potentiometer 18.

Figure 3:
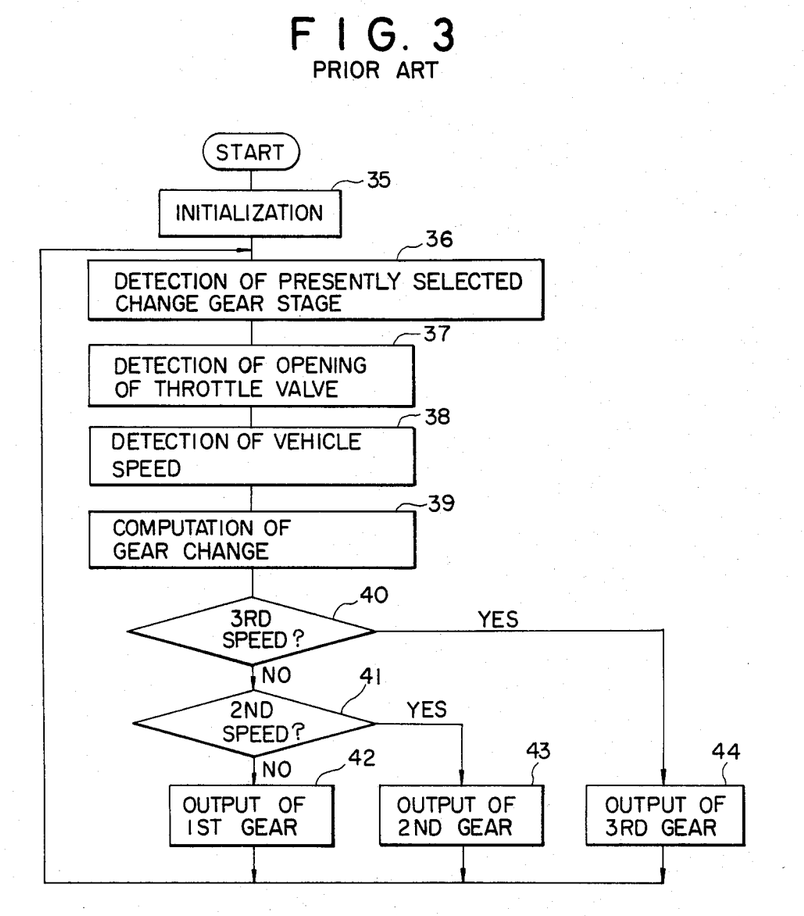
FIG. 3 is a flow chart showing a prior art gear selection method.
Figure 4:
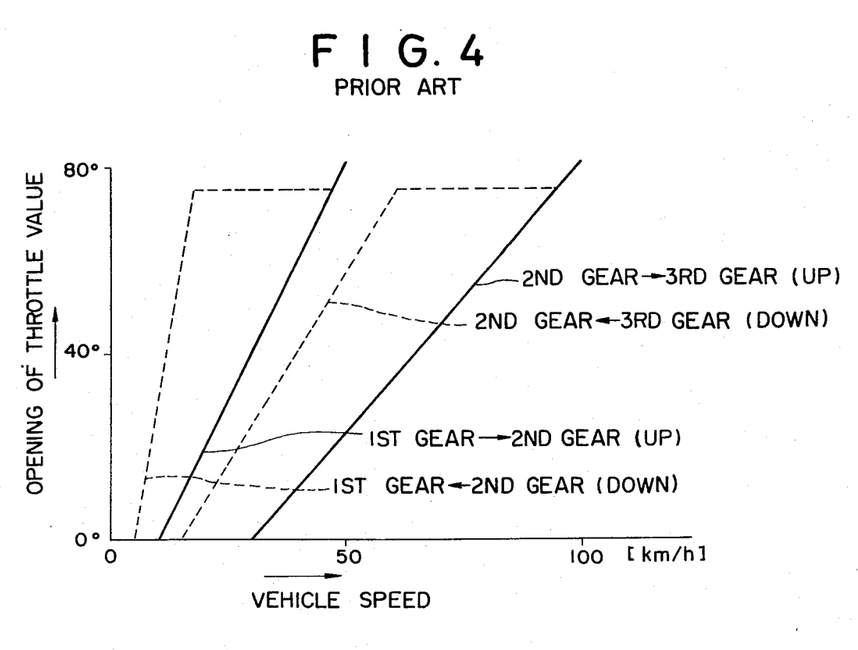
FIG. 4 is a gear selection diagram in the prior art gear selection method.

FIGS. 3 and 4 show respectively a flow chart and gear selection diagram of a prior art gear selection method.

In step 35, the input port 24, output port 27 and RAM 28 are initialized at the same time as the power supply is turned on. In step 36, the presently selected gear selection mode of the automatic transmission is detected. In step 37, the opening of the throttle valve in the carbureter 2 is detected according to the detecting signal from the potentiometer 18. In step 38, the vehicle speed is detected according to the detecting signal from the DC tachometer 19. In step 39, gear selection mode is calculated from the present, the opening of the throttle valve and the vehicle speed detected, respectively, in steps 36, 37 and 38. The gear selection range is determined as shown in FIG. 4 and the gear selection line (solid line represents the gear selection line for up-shift and broken line the gear selection line for down-shift) is fixed with respect to the opening of the throttle valve and vehicle speed; the right side of the respective gear selection lines represents the gear selection mode at the high speed side. In step 40, whether the calculated gear selection range is 3rd gear is detected, and if it is decided yes, the operation proceeds to step 44 to generate an output representative of 3rd gear, and if no, proceeds to step 41. In step 41, whether the computed gear selection range is 2nd gear is detected, and if it is decided yes, the operation proceeds to step 43 to generate an output representative of 2nd gear, and if no, proceeds to step 42 to generate an output representative of 1st gear.

Figure 5:
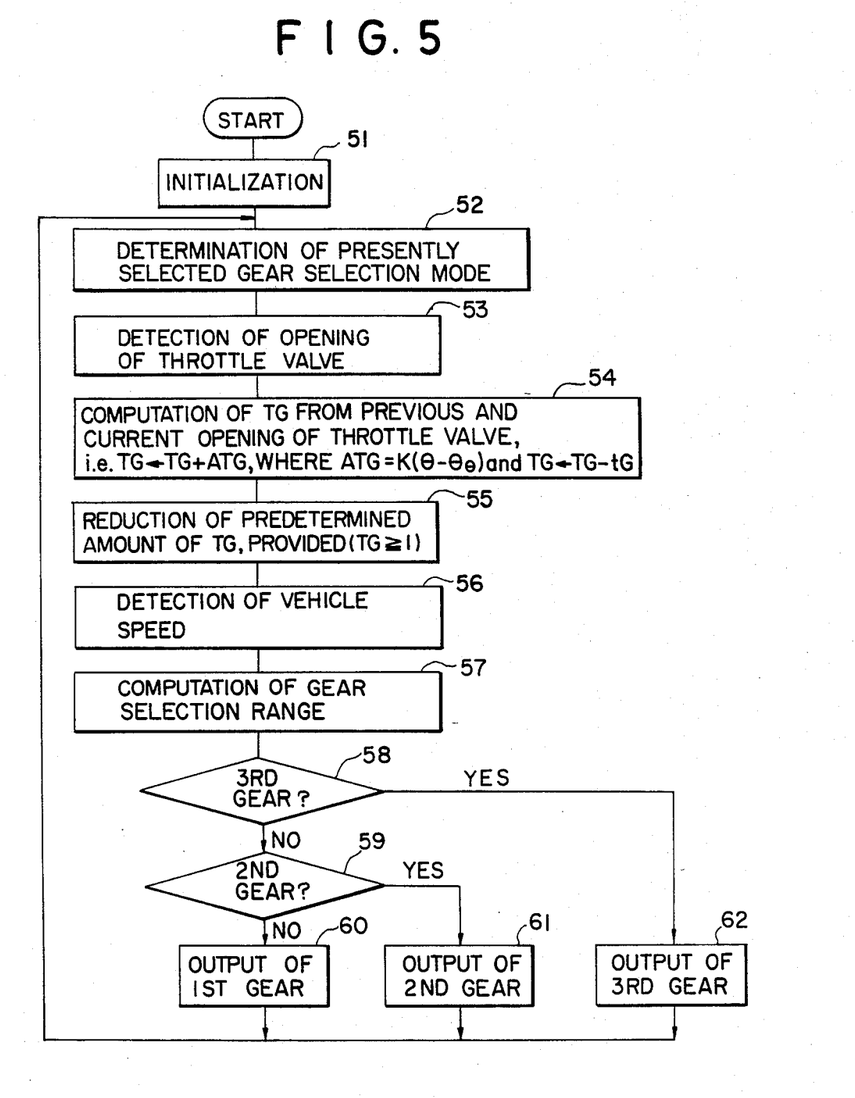
FIG. 5 is a flow chart of an embodiment of this invention.

FIG. 5 is a flow chart showing a gear selection method according to this invention.

Steps 51, 52 and 53 are described as fully corresponding to steps 35, 36 and 37 of FIG. 3. In step 54, a sensitivity compensating amount $\Delta TG$ is calculated from the difference between the opening $\theta_0$ of the throttle valve detected in a previous time and that $\theta$ detected at the present time in step 53:

$$\Delta TG = K(\theta - \theta_0)$$

where K is a factor determined according to design. Since the program is carried out at intervals of a predetermined time, $\Delta TG$ is proportional to the depression speed of the accelerator pedal. This $\Delta TG$ is added to the sensitivity factor TG obtained from the result of control up to the previous time to calculate a new sensitivity factor TG.

$$TG \leftarrow TG + \Delta TG$$

Namely, every time this program is carried out once, the change in the opening of the throttle valve, i.e. one corresponding to the depression speed of the accelerator pedal, is added to provide the new sensitivity factor TG. In step 55, TG minus a predetermined amount tG is made a new TG.

$$TG \leftarrow TG - tG$$

Figure 6:
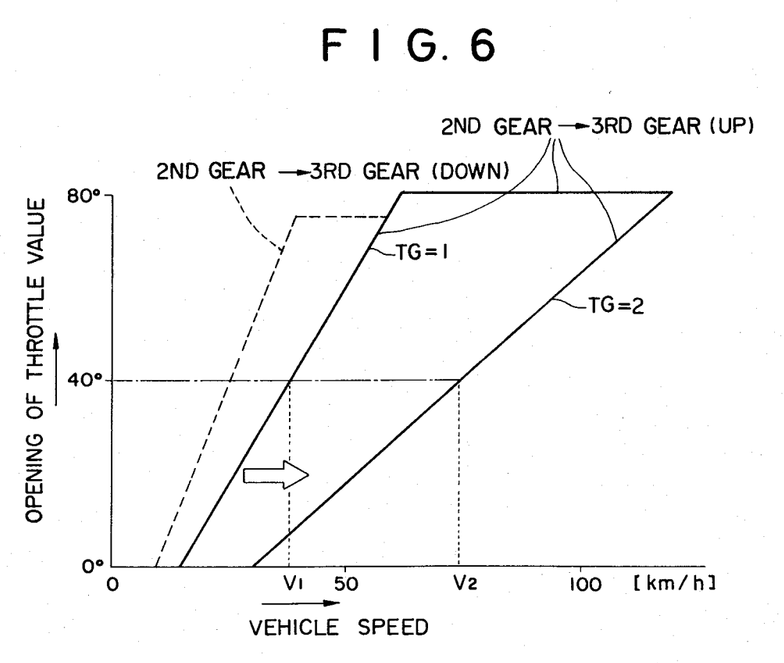
FIG. 6 is a gear selection diagram in the embodiment of this invention.

Namely, every time this program is once carried out, the predetermined amount is subtracted from TG irrespective of the change in the opening of the throttle valve. However, when TG=1, the subtraction in step 55 is interrupted. FIG. 6 shows a gear selection diagram between 2nd and 3rd gear. The down-shift line (broken line) is the same as the prior one and the up-shift line (solid line) is shifted to the high speed side with reference to the up-shift line of TG=1 in response to TG, i.e. the depression speed of the accelerator pedal. For example, when the opening of the throttle valve is 40°, vehicle speeds $V_1$, $V_2$ in the up-shift at TG=1 and TG=2 have the relationship of $V_1 < V_2$. The gear selection mode is calculated in step 57 on the basis of the speed change pattern in FIG. 6. In the example of the drawing, the speed range stage for acceleration is calculated according to $V_2 = TG \times V_1$.

Figure 7:
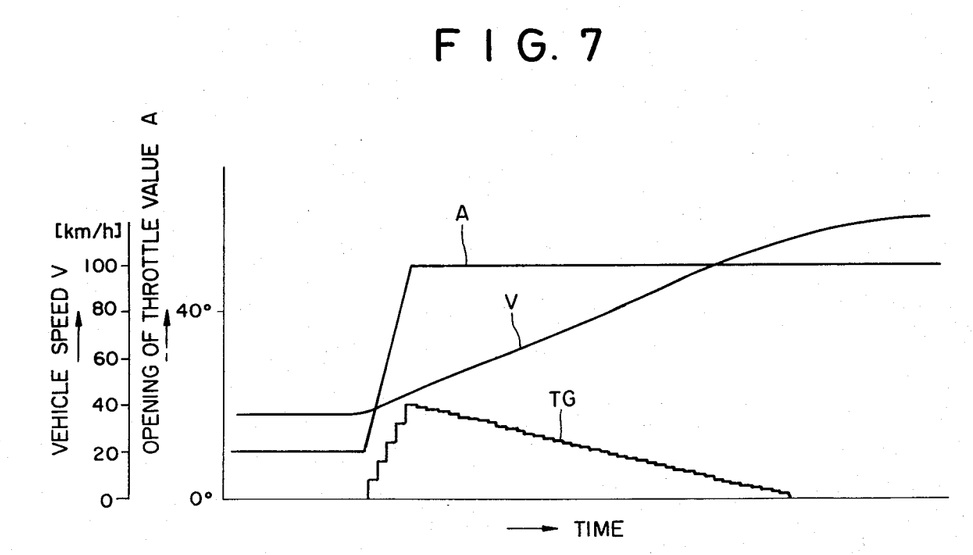
FIGS. 7, 8 and 9 are graphs showing, respectively, the changes in opening of a throttle valve, vehicle speed and coefficient of, sensitivity TG, as a function of time when an accelerator pedal is depressed with various speeds.

FIG. 7 shows the changes in the opening A of the throttle valve, vehicle speed V and sensitivity factor TG as a function of time when the accelerator pedal is rapidly depressed. In a period when the opening A of the throttle valve is increasing, the increase of TG due to the execution of step 54 in FIG. 5 is much larger than the decrease of TG due to the execution of step 55, and TG is increased. When the increase of the opening A of the throttle valve is stopped, TG is thereafter decreased with a predetermined inclination. Thus, the period in which TG has a large value and the transmission is maintained at the low gear mode is lengthened to provide more acceleration.

Figure 8:
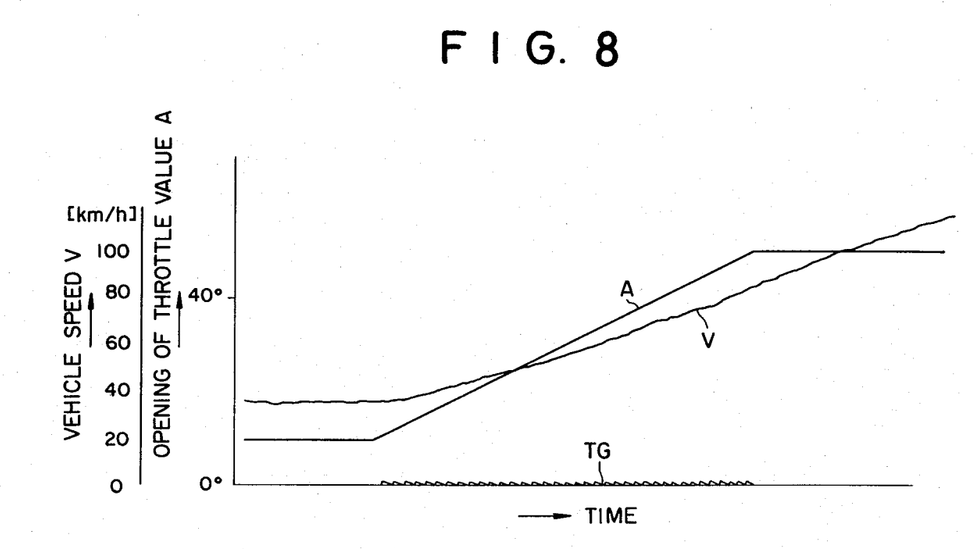

FIG. 8 shows the changes in the opening A, vehicle speed V and sensitivity factor TG as a function of time when the accelerator pedal is slowly depressed. Since the speed of increasing the opening A of the throttle valve is low, the increase and decrease of TG in steps 54 and 55 are approximately balanced with each other to provide TG=0, and the quick up-shift to the high gear mode is carried out to provide slow acceleration for reducing engine noise and fuel consumption.

Figure 9:
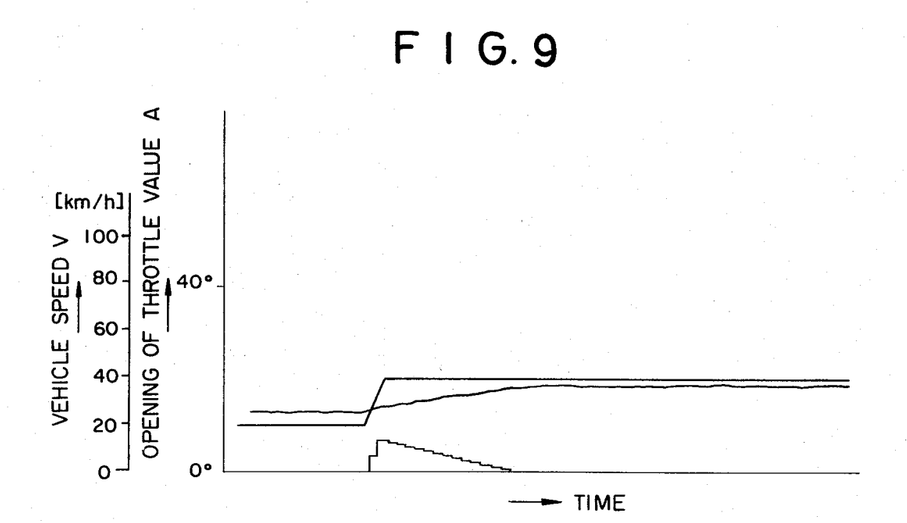

FIG. 9 shows the changes in the opening A of the throttle valve as a function of time when the accelerator pedal is depressed by a predetermined small amount. While it is impossible in the prior art method to set such an opening of the throttle valve to 3rd gear, the vehicle response at the up-shift right after acceleration can be shifted to the high speed side by setting the up-shift line of TG=1 sufficiently to the low speed side to provide acceleration at the 2nd gear for a predetermined time and thereafter running at 3rd gear.

While the gear selection between the 2nd gear and 3rd gear was described with reference to FIG. 6, the gear selection is carried out similarly between the 1st gear and 2nd gear. Namely, the gear selection line is shifted to the high speed side in relation to the increase of TG to determine the gear selection range.

While, in the embodiment, only the vehicle response to be subjected to the up-shift is increased, particularly when the depression speed of the accelerator pedal is high, the vehicle response to be subjected to the down-shift can be also changed in response to the depression speed of the accelerator pedal to carry out the down-shift with high vehicle speed when large acceleration is needed for acceleration from the gear selection low gear mode.

In the gear section diagram, the down-shift line and up-shift line of TG=1 are stored as a numerical table in ROM 29, and predetermined values are read out of the numerical table to calculate the gear selection range during the execution of the program.

Further, instead of decreasing TG by a predetermined amount at every execution of the program such as in step 55, a timer may be used to reduce TG according to an interrupting program activated at intervals of a predetermined time. Furthermore, a pulse generator for generating pulses in synchronization with the rotation of the output shaft of the automatic transmission 7 may be provided to activate the interrupting program according to the pulse generated by this pulse generator, i.e. at every predetermined amount of travel, for decreasing TG by a predetermined amount according to this interrupting program. The travelling distance increases with time and is equivalent to time with respect to the decrease of TG.

What is claimed is:

1. A gear selection method for controlling the supply of oil pressure to one of a hydraulic servo and a frictional engaging unit of an automatic transmission by opening and closing an electromagnetic valve to accomplish a predetermined gear selection, said gear selection method comprising the steps of:
   detecting the speed of the vehicle;
   generating a signal proportional to the speed of depression of an accelerator pedal;
   establishing a reference vehicle speed for actuating gear selection;
   increasing said reference speed as the signal proportional to the depression speed of the accelerator pedal increases; and
   producing output signals for opening and closing said valve in response to said increased reference speed.

2. A gear selection method of an automatic transmission as defined in claim 1 wherein:
   the step of generating a signal proportional to the depression speed of the accelerator pedal includes detecting the speed at which a throttle valve in an intake system of said vehicle opens, by detecting position changes over intervals of time.

3. A gear selection method of an automatic transmission as defined in claim 2, wherein:
   said method further comprises the step of calculating a factor TG related to the speed at which the throttle valve in the intake system opens, and
   the increasing step includes the step of shifting said reference speed towards a high speed side related to a current value of TG.

4. A gear selection method of an automatic transmission as defined in claim 3, wherein:
   the step of detecting the opening speed of the throttle valve in the intake system is executed at intervals of a predetermined time, and includes the steps of calculating the difference $\theta - \theta_0$ between the opening $\theta$ of said throttle valve detected at a present time and the opening $\theta_0$ of same detected at a previous time, multiplying a constant and the difference $\theta - \theta_0$ to produce $\Delta TG$, adding $TG + \Delta TG$ to produce a new value of TG, and subtracting tG from TG, where tG is a predetermined amount, at intervals of said predetermined time to produce a new value of TG.

5. A gear selection method of an automatic transmission as defined in claim 4, wherein:
   said increasing step includes the step of increasing said reference speed in proportion to TG.

6. A gear selection method for controlling a gear selection unit of an electronically controlled transmission for a vehicle, said gear selection method comprising the steps of:
   detecting the speed of the vehicle;
   generating a signal proportional to the speed of depression of the accelerator pedal of the vehicle;
   establishing a reference vehicle speed for actuating gear selection;
   increasing said reference speed as the signal proportional to the depression speed of the accelerator pedal increases;
   producing output signals for actuating the gear selection unit in response to said vehicle speed and said increased reference speed.

7. An electroncially controlled automatic transmission for a vehicle having an accelerator pedal, comprising:
   a gear set;
   a torque converter connected to said gear set;
   a gear selection means for selecting the operative orientation of gears in said gear set; and
   means for detecting the speed of said vehicle and further comprising;
   means for generating a signal proportional to the speed of depression of said accelerator pedal; and
   processing means for:
      establishing a reference vehicle speed for actuating said gear selection means,
      increasing said reference speed at which said gear selection means is actuated as the depression speed of said accelerator pedal increases, and
      producing output signals for actuating the gear selection means in response to a comparison of said detected speed and said reference speed.

8. Apparatus for controlling a gear selection unit of an electronically controlled automatic transmission for a vehicle having an accelerator pedal, said apparatus comprising:
   means for detecting the speed of said vehicle;
   means for generating a signal proportional to the speed of depression of said accelerator pedal; and
   processing means for:
      establishing a reference vehicle speed for actuating gear selection,
      increasing said vehicle speed at which said gear selection unit is actuated as the depression speed of said accelerator pedal increases, and
      producing output signals for actuating the gear selection unit in response to said detected speed and said reference speed.

9. Apparatus as defined in claim 7 or 8, wherein:
said vehicle includes an intake system having a throttle valve; and
said means for generating a signal proportional to the depression speed of said accelerator pedal includes means for detecting the speed at which said throttle valve opens.

10. Apparatus as defined in claim 9, wherein:
said processing means calculates a factor TG related to the speed at which said throttle valve opens; and
said increasing function of said processing means shifts said reference speed toward a high speed side related to the current value of TG.

11. Apparatus as defined in claim 10, wherein:
said means for detecting the opening speed of said throttle valve includes means for detecting the throttle valve opening speed at intervals of a predetermined time; and said processing means calculates the difference $\theta - \theta_0$ between the opening $\theta$ of said throttle valve detected at the present time and the opening $\theta_0$ of said throttle valve detected at a previous time, multiplies a constant and the difference $\theta - \theta_0$ to produce $\Delta TG$, adds TG and $\Delta TG$ to produce a new value of TG, and subtracts tG from TG, where tG is a predetermined amount, at intervals of said predetermined time to produce a new value of TG.

12. Apparatus as defined in claim 11, wherein:

said processing means increases said reference speed in proportion to TG.

* * * * *